P. J. MARKS.
PHOTOGRAPHIC SHUTTER.
APPLICATION FILED APR. 13, 1908.

946,679.

Patented Jan. 18, 1910.
5 SHEETS—SHEET 1.

Witnesses
Walter B. Payne
Nelson Copp

Inventor
Paul J. Marks
By Church & Rich
His Attorneys

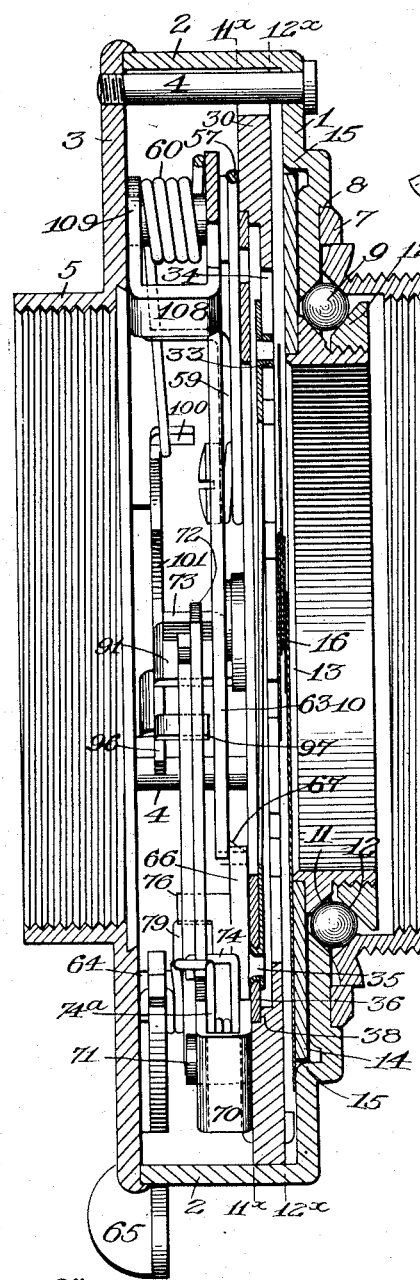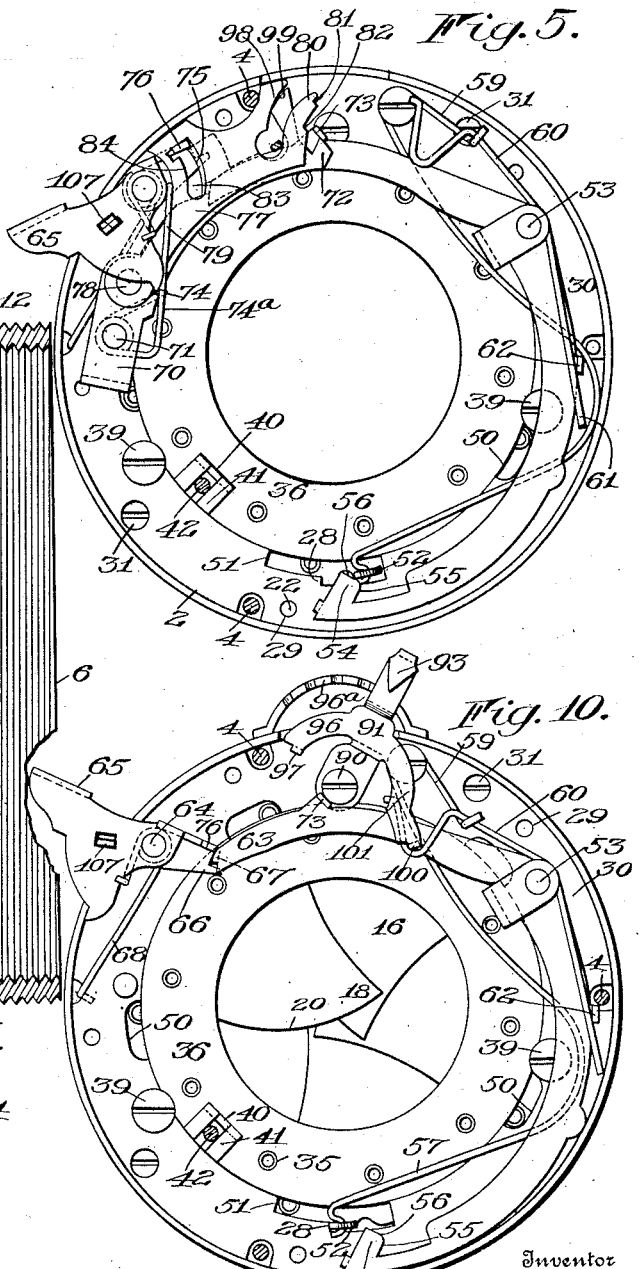

P. J. MARKS.
PHOTOGRAPHIC SHUTTER.
APPLICATION FILED APR. 13, 1908.
946,679.
Patented Jan. 18, 1910.
5 SHEETS—SHEET 3.
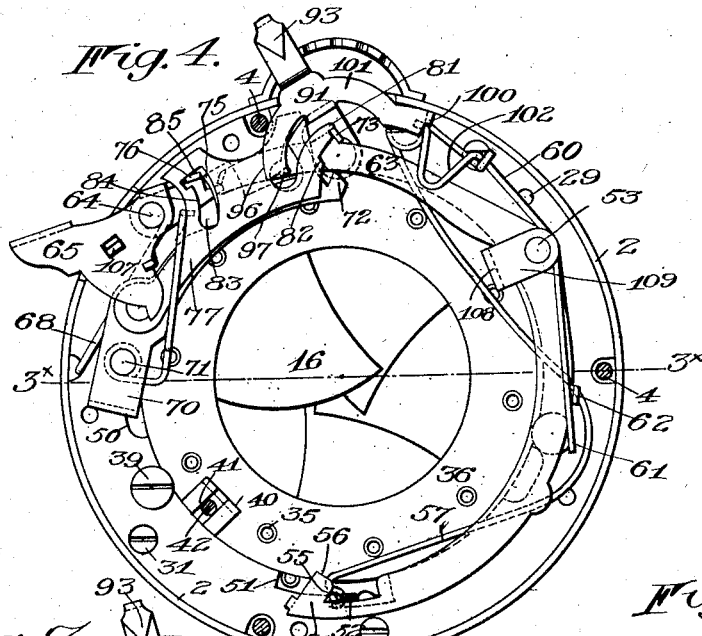
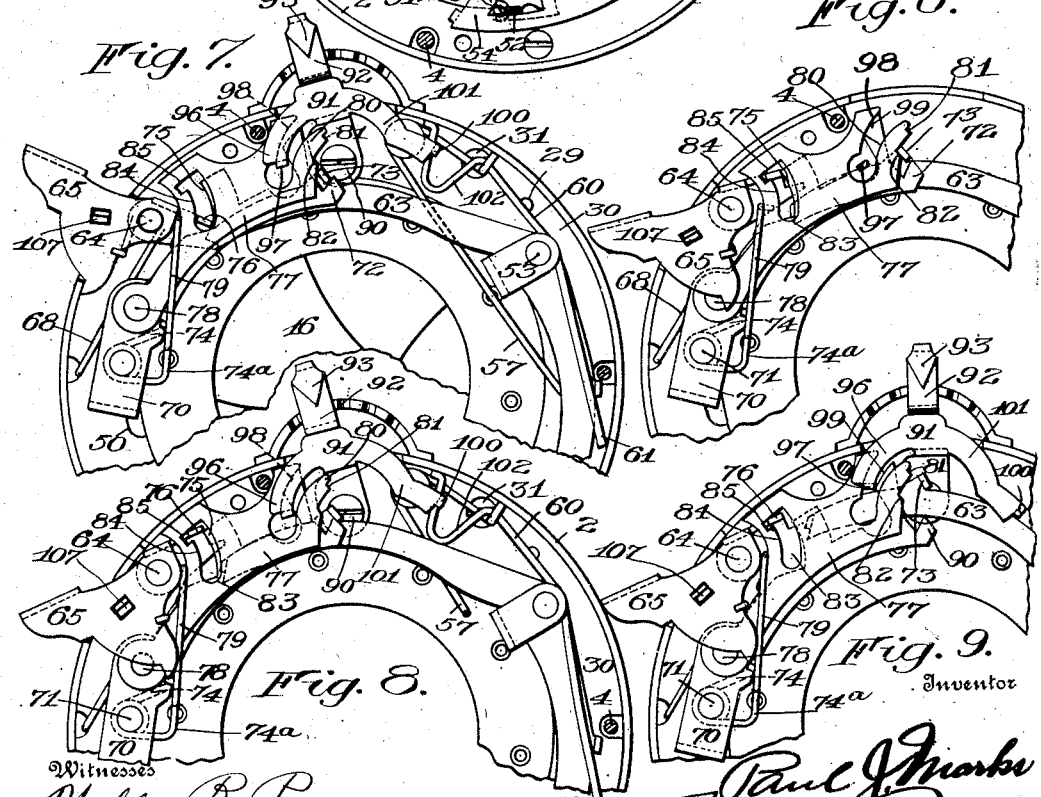
Witnesses
Walter D. Payne.
Nelson Copp.
Inventor
Paul J. Marks
By Church & Rich
His Attorneys P. J. MARKS.
PHOTOGRAPHIC SHUTTER.
APPLICATION FILED APR. 13, 1908.
946,679.
Patented Jan. 18, 1910.
5 SHEETS—SHEET 4.
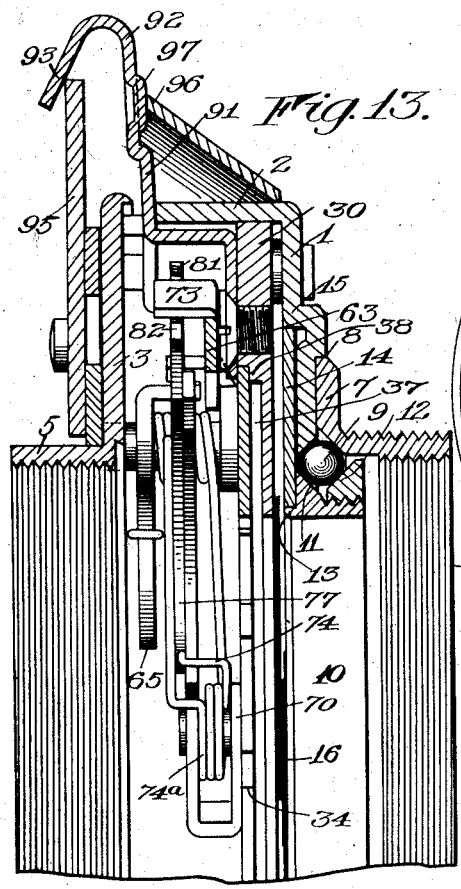
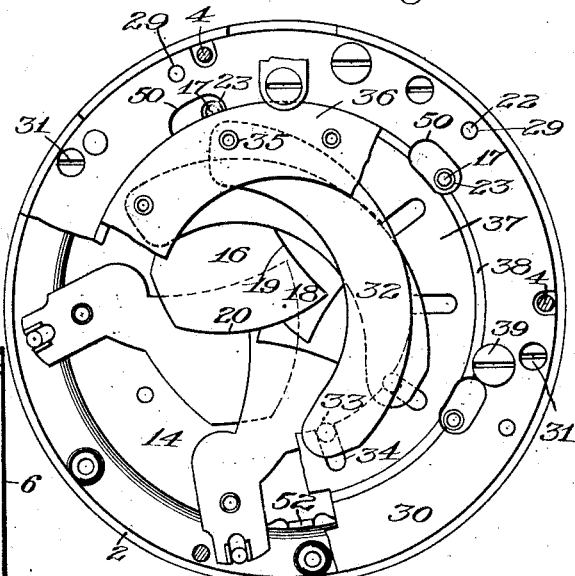
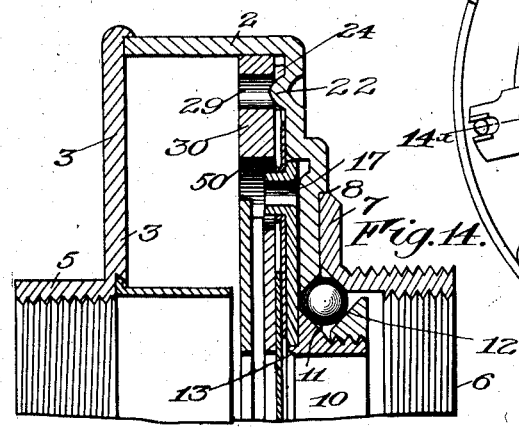
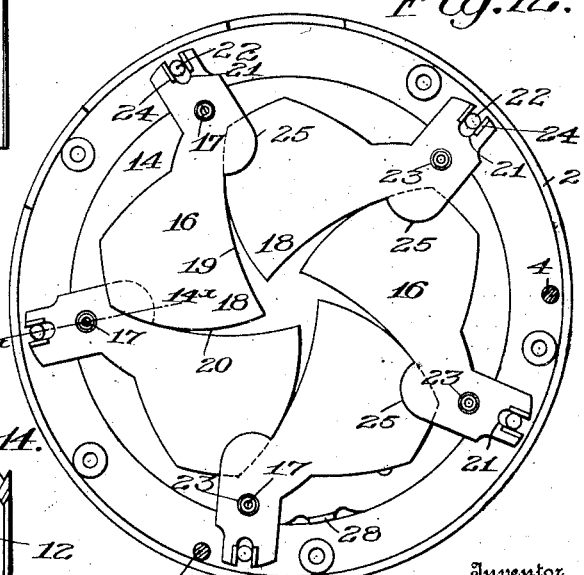
Witnesses
Walter B. Payne.
Nelson Copp.
Inventor
Paul J. Marks
By
Attorneys P. J. MARKS.
PHOTOGRAPHIC SHUTTER.
APPLICATION FILED APR. 13, 1908.
946,679.
Patented Jan. 18, 1910.
5 SHEETS—SHEET 5.
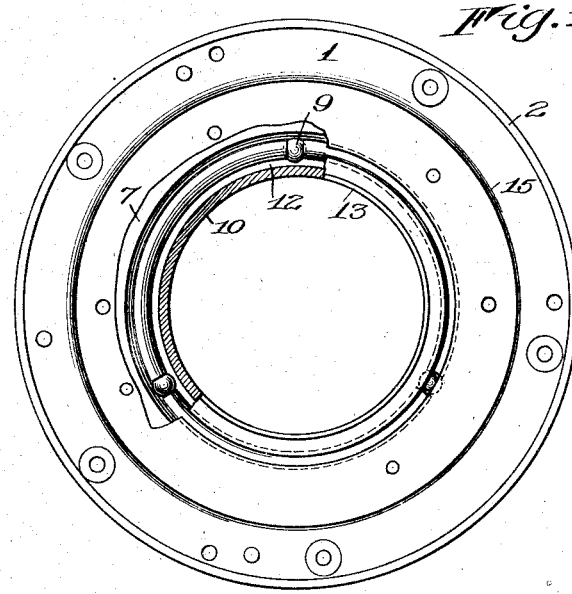
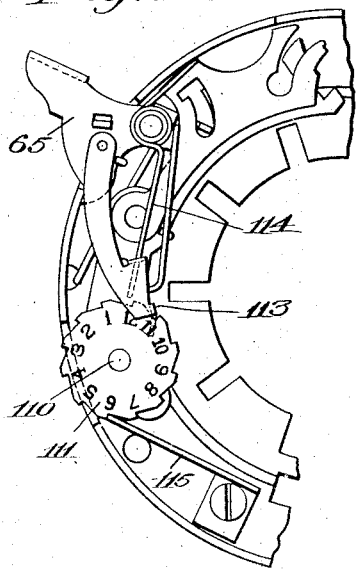
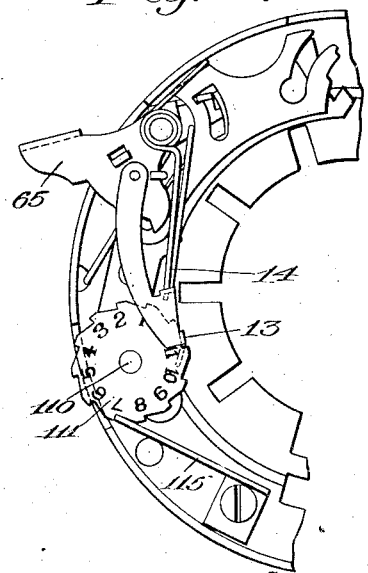
Witnesses
Walter B. Payne
Nelson Copp
Inventor
Paul J. Marks
By Church & Rich
his Attorneys

UNITED STATES PATENT OFFICE.

PAUL J. MARKS, OF ROCHESTER, NEW YORK, ASSIGNOR TO EASTMAN KODAK CO., OF ROCHESTER, NEW YORK, A CORPORATION OF NEW YORK.

PHOTOGRAPHIC SHUTTER.

946,679.    Specification of Letters Patent.   Patented Jan. 18, 1910.

Application filed April 13, 1908. Serial No. 426,674.

*To all whom it may concern:*

Be it known that I, PAUL J. MARKS, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to camera shutters and particularly to that class in which the exposure aperture is closed by a plurality of overlapping pivoted blades, and it has for its object to provide a novel arrangement of these blades and an improved means for operating them, whereby the exposure aperture may be opened and closed with great rapidity, and the maximum amount of light permitted to pass therethrough during said opening and closing movements.

The invention also has for its object to provide certain novel features in connection with the mechanism for controlling the operation of the blades for making exposures of different time duration, including a safety catch for the master member, and an improved arrangement of these parts, whereby they may be manufactured cheaply and easily assembled.

To these and other ends the invention consists in certain improvements and combinations of parts all as will be hereinafter more fully described, the novel features being pointed out in the claims at the end of the specification.

Figure 1:
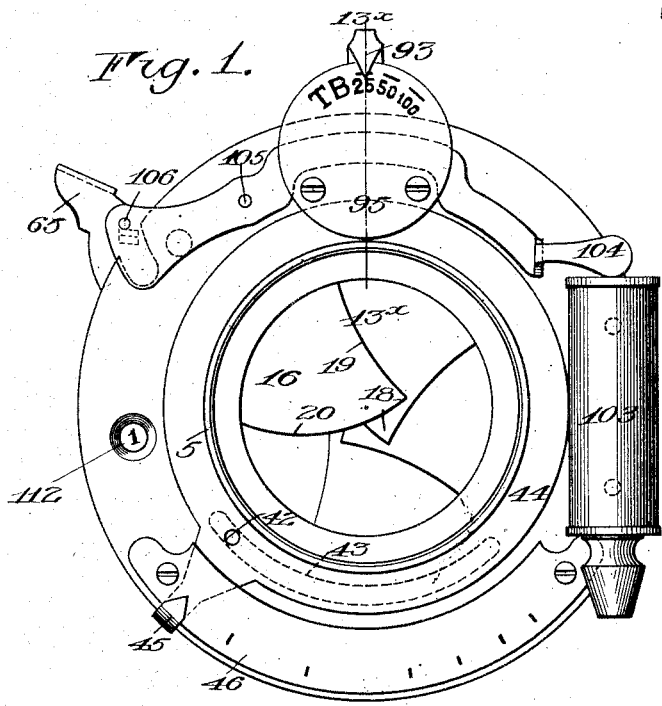
Figure 2:
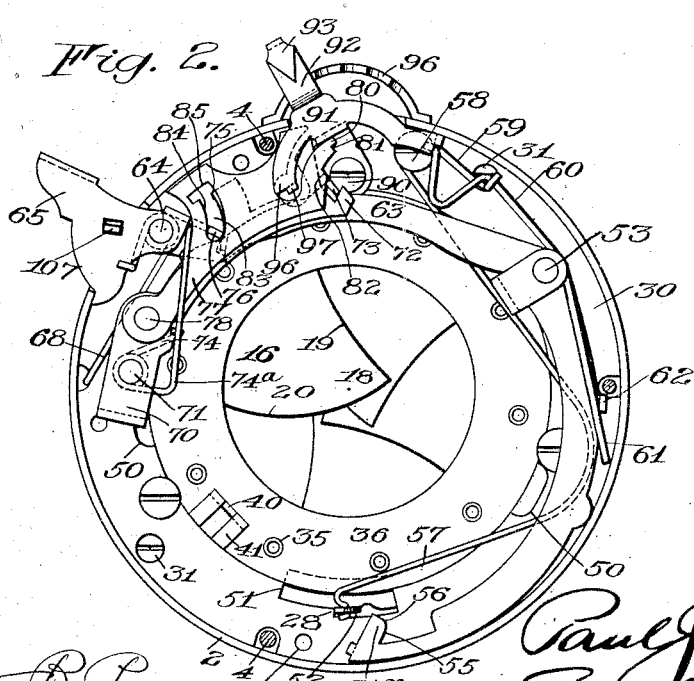

In the drawings: Figure 1 is a front elevation of a shutter constructed in accordance with my invention. Fig. 2 is a similar view with the front of the casing removed, the parts of the shutter mechanism being shown in their normal position. Fig. 3 is an enlarged cross sectional view taken on the line 3ˣ—3ˣ of Fig. 4. Fig. 4 is a view similar to Fig. 2, showing the operating member in the actuated position, the master member having been operated to open the exposure blades and caught on the safety stop, and Fig. 5 shows the position of the master member arrested on the bulb stop after the safety stop has been tripped out of engagement therewith. Fig. 6 is a detail view of the levers controlling the operation of the exposure blades with the master member arrested on the time lever stop. Figs. 7 and 8 are detail views of the lever mechanism showing the exposure controlling member set in the position for making bulb exposures, the first view showing the controlling levers and the master member in the normal position and the latter illustrating the master member after it has been actuated, to open the exposure leaves, released and caught on the bulb stop. Fig. 9 is a view showing the exposure controlling member set in the position which it occupies when exposures of 1/25 of a second are to be made, the operating member being illustrated in the actuated position at the point which it occupies when the master member is about to be released to close the exposure blades. Fig. 10 is a view similar to Fig. 9, showing the exposure controlling member adjusted in the position which it occupies when it is set for making exposures of very short duration, such as 1/100 of a second, the master member and operating member in this view being shown in their normal position. Fig. 11 is a view taken on the line 11ˣ—11ˣ of Fig. 3, parts of which are broken away to illustrate in detail the arrangement of the blades controlling the exposure aperture of the shutter and the diaphragm blades which may be adjusted to vary the size of said aperture. Fig. 12 is a sectional view taken on the line 12ˣ—12ˣ of Fig. 3, showing the manner of mounting and operating the exposure blades. Fig. 13 is a detail sectional view taken on the line 13ˣ—13ˣ of Fig. 1. Fig. 14 is an enlarged detail sectional view, illustrating the mounting of the exposure blades, which is taken on the line 14ˣ—14ˣ of Fig. 12. Fig. 15 is a plan view showing the interior of the casing illustrating the mounting of the journal member carrying the shutter blades. Figs. 16 and 17 are detail views illustrating the indicator controlled by the operating member of the shutter, the first view showing these parts in their normal position and the second in the actuated position.

Similar reference numerals in the several figures indicate similar parts.

In carrying out the invention the operating parts of the shutter are all mounted within the casing comprising the back plate 1 surrounded by the annular wall 2 on which is supported the front or cover 3 secured by screws or rivets 4 and having the forwardly projecting interiorly threaded collar 5 adapted to receive the forward lens or lens system, the complement or rear lens or lens system thereof being secured within the threaded collar 6, surrounding the central aperture in the rear wall 1 of the casing, said collar being also exteriorly threaded, as illustrated in Fig. 3, to permit the shutter to be mounted on the usual carriage forming the front of a camera. The collar 6 is provided with a laterally extending flange 7 by means of which it may be secured by screws, rivets or other suitable fastening devices to the rear wall of the casing, and the latter is provided with an annular recess, as indicated at 8, to accurately center the ring 6 in alinement with the collar 5 on the front of the casing. The edge of the aperture in the rear wall and the proximate end of the ring 6 are chamfered to provide a V-shaped annular channel, as shown particularly in Figs. 3, 13 and 14, forming a raceway in which anti-friction bearing balls 9 may be arranged and on which is journaled the member employed for operating the exposure blades. This member comprises the annulus 10 located within the aperture of rear wall 1 and extending rearwardly therefrom, its interior diameter defining the exposure aperture of the shutter. On the outer side of the ring are the opposing inclined bearing shoulders 11 and 12 engaging the inner surface of the balls 9, the rear shoulder 12 being preferably made as a separate part which is threaded on the annulus 10, permitting its adjustment, both to facilitate the mounting of the member in the shutter casing and also to enable the bearing to be adjusted to take up any lost motion therein. The forward edge of the annulus, indicated by 13, projects beyond the shoulder 11 and is expanded or beaded to tightly fit the blade-carrying ring 14, which lies within the recess formed by off-setting the central portion of the back wall 1 of the casing, as indicated by 15.

The shutter blades controlling the exposure opening, illustrated particularly in Figs. 11 and 12, and indicated by 16, are located in front of and are operated by the oscillatory movement of the ring 14. There are five of these blades, which are pivoted upon bosses 17 struck up from said ring at equidistant points. The blades are shaped, as shown in Fig. 12, with the points 18 which are adapted to overlap when in the normal position to close the exposure aperture of the shutter, as shown in Figs. 1 and 11. Each blade has the lateral edge 19 and the bottom edge 20 so curved that during their opening and closing movements the five-pointed star-shaped aperture, shown in Fig. 12, is formed, the points of the star, developed between the bottom edge of each blade and the lateral edge of the adjacent blade, increasing in breadth as the points 18 of said blades move outwardly. It will be seen, therefore, that as soon as the blades commence their opening movement, the aperture is not confined entirely to the center of the lens system, as is the case in shutters of the iris diaphragm type, but that by reason of the fact that a star-shaped aperture is formed almost at the commencement of the opening movement of the blades, which rapidly increases until the entire exposure aperture is uncovered, and again decreases until the points of the blades overlap the rays of light admitted through the lens system cover a larger field for a greater proportion of the time during which the blades are in operation than is the case in other shutters. As the star-shaped aperture exposes the face of the lens uniformly, a high illumination through all parts thereof is obtained which greatly facilitates photographing rapidly moving objects when the parts of the shutter are set to operate.

Projecting outwardly from the pivotal points of the blades are tips provided with the slots 21 which extend at opposite sides of the bosses 22 struck up from the rear wall 1 of the casing. As the blades are made of extremely thin material to reduce their weight to a minimum, their pivotal apertures surrounding the bosses 17 are provided with laterally extending shoulders 23 and the edges of their tips which have a slight longitudinal, as well as a rotary movement about the bosses 22, are provided with similar shoulders 24. The points of the blades overlap when closed and as it is desirable to maintain them in their original assembled position, each blade is provided in proximity to its pivotal point with an apron 25 which overlaps the rear edge of the adjacent blade and serves as a guide for its point 18 as said blades are rotated outwardly. The remaining parts of the shutter mechanism are mounted upon an assembling plate in the form of a ring 30 of which the master member, the operating member, the time controlling levers and the exposure controlling member, together with the diaphragm, may all be assembled, these parts being then all introduced into the shutter casing, and secured in proper position by screws passing through the ring 30 into the rear wall 1 of said casing.

An iris diaphragm is employed for regulating the diameter of the exposure opening, comprising overlapping curved blades 32 formed of thin sheet material at each end of which are formed collars, the ones indicated by 33 being positioned and guided in the radially extending slots 34 formed in the plate 30, the collars 35 extending through apertures in the adjusting plate 36 in which they are upset. This fastening of the blades permanently connects them to the adjusting plate 36 which greatly facilitates assembling these small parts, as it is then only necessary to locate the collars 33 in the respective slots 34, and if for any reason it is desired to detach the diaphragm, the blades may be removed with the ring 36 to which they are united. The face of the assembling plate 30 is provided with a recess 37 which accommodates the blades 32 and surrounding the latter is a circular shoulder 38 on which the ring 36 is seated and adjustably secured beneath the edges of the heads of screws 39. In order to adjust the ring 36 to the position of blades 32 to provide an exposure aperture of the desired dimensions, said ring is provided with a forwardly extending shoulder 40 which is provided with a laterally extending slotted finger 41 adapted to receive a pin 42 projecting through the segmental slot 43 on the front 3 of the shutter casing and carried on the ring 44 journaled on the collar 5, said ring being provided with the arm 45 which projects outwardly beneath an index scale 46, which also serves as a means for retaining the ring 44 against outward movement on the collar 5. The end of the arm 45 is bent over the scale plate and coöperates with the indexes thereon, as shown in Fig. 1.

The assembling plate 30 rests upon the inwardly extending bosses 22 and is provided with apertures 29 registering therewith, which receive the points of the bosses, as shown in Fig. 14, and prevent the disengagement of the tips of the exposure blades therefrom. Where the plate overlies the paths of the bosses 17 on the operating member 14 it is provided with elongated apertures 50 and at its lower side it is provided with a similar aperture 51 which accommodates the laterally extending operating projection 52 on the blade operating plate 14 which coöperates with the free end of the master member. At one end of the aperture is a shoulder 28, which engages the projection 52 and limits the forward movement of the plate 14. The master member is pivoted on the post 53 on the assembling plate 30 and in its normal position its free end lies in rear of the projection 52, as shown in Fig. 2, but when it is advanced and set in position to open the exposure blades the finger 54 thereon is carried over the projection 52 into engagement with the forward side thereof, the upper edge of said projection being beveled to permit the free end of the master member to be deflected and ride over it to drop into engagement with its edge, in the position shown in Fig. 4. The free end of the master member reciprocates across the path of the operating projection 52 which is concentric to the exposure aperture and the rear shoulder 55 of the finger 54 is given sufficient length to retract the operating projection, to oscillate the blade operating plate 14 a sufficient distance to open the exposure blades, and the end 56 of the finger is arranged at such an angle relatively to the pivotal point of the master member that the projection 52 is held in its retracted position until the end of the finger has been moved out of its path. It will thus be seen that the rear shoulder of the finger serves to open the shutter blades, while the end of the finger retains them in this position while it is being carried past the projection and that if the master member is prevented during its release movement from carrying the end 56 of the finger 54 out of engagement with the projection 52, the blades will be retained in open position, a fact which permits the shutter blades to be controlled for making either time or bulb exposures by a comparatively simple arrangement of controlling devices. The motor spring for restoring the blade operating member 14 to its normal position to hold the blades 16 closed, is indicated by 57. One end thereof is secured in a perforation in the projection 52 and the other end is loosely coiled about a stud or screw 58 and has its extremity 59 looped around the end of the spring 60, which latter is coiled on the stud 53, and has the end 61 bearing against the projection 62 on the master member for actuating the latter into its normal position.

The master member is provided with the actuating end 63 which extends over the exposure aperture of the shutter into proximity with the finger piece operating lever 65 pivoted on the stud 64 and projecting exteriorly of the casing. At its inner end the lever terminates in an operating projection 66 which is adapted to engage with the downwardly turned extremity 67 of the master member, as shown particularly in Fig. 10, for moving said member into the position shown in Fig. 4, when it is released, as shown in Fig. 9, by reason of the operating and operated parts moving in intersecting paths and passing out of engagement. A latch connection is made between these parts by beveling the underside of the projection 67 so that when the lever 65 is released and returned to its normal position by the spring 68, its projection 66 will deflect the end 63 of the master member and resume its normal position in front of the projection 67, as shown in Fig. 10.

In order to control the closing movement of the exposure blades of the shutter to permit the making of time exposures, in which said blades are opened and retained open until the operating member 65 is actuated the second time, and also to permit so-called bulb exposures to be made, the durations of which are determined by the length of time said operating member is held in depressed position, the so-called time and bulb stop levers are arranged for controlling the movement of the master member after it has been actuated and released by the operating member. These levers are moved by the operating member and are governed in their movement by the exposure controlling member, which will be presently described. The bulb stop lever 70 is pivoted upon the post or stud 71 and at its outer end it is provided with the stop 72 which is adapted to engage the shoulder 73 on the end 63 of the master member, into alinement with which it is rotated by the end 74 of a spring 74ª coiled around the stud 71. On this lever 70 is a cam surface 75 which is adapted to coöperate with the trip projection 76, on the operating member 65, to move the lever 70 inwardly against the tension of the spring 74 for the purpose of moving the stop 72 out of engagement with the projection 73 to release the member whenever the operating member 65 is released and returned to its normal position by its spring 68. The time lever 77 is carried on and pivotally connected to the bulb stop lever 70, at the point 78, and coöperating therewith is the other end 79 of the spring 74ª which normally tends to move said lever inwardly in a direction opposite to the movement imparted to the lever 70 by the other end of said spring. The outer extremity or nose 80 of the time lever 77 has a notch 81, forming a safety stop, and a notch 82, forming a time stop, which latter coöperates with the projection 73 on the master member and receives the latter after it has been disengaged from the stop 72 on the bulb lever. The time lever is provided with an aperture 83 in which the trip projection 76 on the operating member travels. The rear side of this recess is provided with a cam surface 84 which moves the time lever outwardly against the tension of the spring 79 during the downward or actuating movement of the operating member 65 and then releases the time lever as the projection 76 passes off the point of the cam, just prior to the release of the master member by the disengagement of the coöperating projections 66 and 67. This releasing of the time lever allows the safety stop 81 to move into the path of the projection 73 on the master member and carry the point of the cam 84 beneath the projection 76 of the operating member, before said projection passes off the cam surface 75 of the bulb lever 70, said cam surfaces 75 and 84 and the projection 86 being then in the position shown in Fig. 4. At the time the master member is caught on the safety stop 81, the finger 54 thereon has passed over the operating projection 52 of the blade operating member 14, the blades being then in the closed position. Now, if the operator carelessly neglects to depress the operating member 65 to the limit of its movement the shutter blades will remain closed and the master member locked to prevent a false exposure being made. The advantage in locking the master member is obvious, for otherwise, should the operator fail to move the projection 76 beyond the end of the cam 75 of the bulb lever 70, the operating member 65 would be permitted to return to its normal position with the master member, and the latter would open the blades and release them to give a practically instantaneous exposure when a time exposure was desired, and the exposure controlling member was set in the time position.

The safety stop 81 moves into alinement with the projection 73 of the master member and rests in the position shown in Fig. 4, under the circumstances just described, but if the operator continues the downward movement of the operating lever 65 the trip projection 76 will engage the upper surface 85 of the slot 83 to again elevate the time lever after said projection has passed beyond the cam surface 75 of the bulb lever at which time the latter is rotated outwardly by the spring 74, so that upon the release of the master member the projection 73 thereon is arrested upon the bulb stop 72, as shown in Fig. 5. Now, the release of the operating member 65 permits the projection 76 to be rotated into engagement with the point of the cam 75 to move the bulb lever inwardly and as the time lever 77 moved by the spring 79, follows the inward movement of the projection 76 the master member projection 73 will be transferred from the bulb stop 72 to the time stop 82, on which it will remain holding the exposure blades in the open position until the time lever is moved outwardly by the subsequent depression of the operating lever and the engagement of the projection 76 with the end 85 of the slot.

When the shutter is set for making time exposures the operating member is prevented from returning to its normal position to prevent engagement of its operating projection 66 with the projection 67 of the master member, by the point of the cam 84 which then lies in front of the projection 76 of the operating member while the master member is held on the time stop 82, as shown in Fig. 6.

Mounted on the upper part of the assembling plate 30 and pivoted upon the screw or stud 90 is the exposure or speed controlling member 91 having the operating arm 92 projecting exteriorly of the shutter casing, the extremity of which is bent over to form an index finger 93 coöperating with the indexes T, B, 25, 50 and 100, arranged upon a circular plate 95 attached to the front of the casing, as shown particularly in Figs. 1 and 13. In the rear of the arm 92 there is mounted on the wall 2 of the shutter casing a semi-conical shaped boss having a rim 96 provided with notches with which a projection 97 on the finger 92 engages in order to hold the latter in whatever position of adjustment it may be set.

The member 91 is provided with a laterally extending arm 96 at the extremity of which is a projection 97 extending rearwardly through slots formed in both the time and bulb stop levers which when the member is adjusted by the arm 92 to the bulb position shown in Fig. 7, with its pointer coöperating with the letter B, engages the inner end of a cam surface 98 on the time lever 77 to hold the latter in retracted position so that when the operating member 65 is operated downwardly, the master member will be actuated, released and then caught on the bulb stop 72 and retained in this position, holding the exposure blades open, until the operating member is released to disengage the bulb lever from the master member by the projection 76 in its downward movement engaging the point of the cam 75. The outer end of the cam surface 98 is formed concentric to the pivot of the member 91 so that in whatever position the exposure and speed controlling member 91 is adjusted, with the exception of the time position, the time lever will be held inoperative, as will be seen from an inspection of Figs. 7, 8, and 9. In making the so-called instantaneous exposures the bulb stop lever is also moved to an inoperative position by the cam finger 99 thereon, which is pushed inwardly and held by the projection 97 when the member 91 is rotated to position the pointer in register with one or another of the speed indicating numerals 25, 50 or 100.

The tension of the motor spring 57 and the spring 60, operating the master member, are both proportioned to normally give an exposure of a duration of 1/25 of a second, but as it is desirable in some instances to make quicker exposures by increasing the speed of movement of the master member and blades, these springs are arranged to co-act with the tension-adjusting finger 100 arranged at the extremity of the arm 101 on the member 91, when the latter is adjusted with its indicator in engagement with either of the index numerals 50 or 100. A simple means of accomplishing this object is illustrated in the drawings in which the end 60 of the spring operating the master member is shown provided with a loop 102 with which the tension finger 100 engages and places said end of the spring under tension when the member 91 is adjusted into either of the two last mentioned positions, as shown particularly in Fig. 10. The motor spring, as before mentioned, is provided with a coil lying beneath the head of the screw or stud 58 on which it is loosely journaled, the extremity 59 thereof being wrapped around the end 60 of the aforementioned spring so that its normal tension is also increased when it is desired to operate the shutter at one of the higher speeds. The shutter is also provided with the usual pneumatic engine illustrated in Fig. 1, comprising the cylinder 103 containing the usual piston for operating the lever 104 pivoted to the front of the camera casing, at the point 105, and carrying the projection 106 which is adapted to bear against the boss 107 on the operating member 65. The lever 104 extends in rear of the index plate 95 and the latter also overlaps the journal ring 44 of the diaphragm adjusting arm and serves to keep these two parts in proper position on the front plate 3.

The studs 53, 64 and 71 on which the different members of the shutter are pivoted, extend outwardly from the assembling plate 30 and each of the parts arranged on these studs is formed in such a manner that a journal bearing is provided for it at both the upper and lower ends of the stud which prevents the members from becoming displaced or tilting out of adjustment after they become worn. This is a particularly important feature in connection with those parts, such as the master member and the operating lever which have a comparatively wide range of movement. The double journal bearing construction is illustrated particularly in Fig. 3, in connection with the master member, which is shown as being pivoted at the bottom of the stud and provided with the outwardly extending ear 108, the extremity of which is bent laterally, as indicated at 109, and embraces the outer end of the stud 53. Another advantage is obtained in forming the parts in this way, as housings are provided in which the respective operating springs of the levers are contained, so that especial care is not required to retain these in position after the levers with which they coöperate are assembled in their proper position.

Mounted within the casing on the post 110 is a device 111 for indicating the number of exposures which consists of a disk provided with numerals, as shown, which register with an aperture 112 in the front plate 3 of the shutter casing. The periphery of the indicator disk extends through an aperture in the side wall 2, whereby it may be engaged by the operator's finger to rotate it to cause a desired numeral to appear beneath the aperture. The edge of the disk is also notched and coöperating therewith is the pawl 113 which is pivoted to the operating lever 65 and is held in operative position by the spring 114. Also coöperating with the notches of the disk is a retaining pawl 115.

The shutter embodying the improvements herein described consists of few parts all of which may be made from sheet metal blanks formed by punching and dying operations. The locating of the blade operating member in rear of blades materially reduces the thickness of the casing and the journaling of the member in the manner described, assures a free and quick movement of the blades under all conditions of operation. Further, the arrangement of the other operating parts on the assembling plate, which latter also holds the exposure blades in operative engagement with their pivots on the rear wall of the casing and their operating member, greatly facilitates the assembling operation in addition to providing a structure capable of withstanding hard usage.

I claim as my invention:

1. In a shutter, the combination with a casing comprising a rear and side walls, an interior blade mounting plate fitting within the side walls, exposure blades arranged between the rear wall and the plate and a member located behind the blades for operating them, of mechanism arranged on the front of the plate and within the side walls of the casing for controlling the movement of the blade operating member.

2. In a shutter, the combination with a casing comprising side walls and a rear wall provided with a recess, an oscillatory operating member located in the recess, and exposure blades arranged in front of and operatively connected to said member, of a blade mounting plate arranged within the casing in front of the blades and mechanism assembled on the front of the plate and within the casing for controlling the movement of the blade operating member.

3. In a shutter, the combination with a casing having a rear wall provided with an aperture, exposure blades for closing said aperture arranged in the casing and a member for operating the blades arranged in the aperture of the rear wall and defining the limits of the exposure aperture of the shutter and movably supported on the rear wall, of mechanism for controlling the movement of the blades.

4. In a shutter, the combination with a casing having a rear wall and provided with a circular aperture, a ring forming the exposure aperture of the shutter journaled on the edge of the wall surrounding the aperture, of blades arranged within the casing and operated by the ring for opening and closing the exposure aperture and mechanism also located within the shutter casing for controlling the opening and closing movement of the blades.

5. In a shutter, the combination with a casing provided with a rear wall, having an outwardly projecting collar having a ball race way located in rear of the inner face of the wall, balls arranged in the raceway and a ring journaled on the balls and projecting into the casing, of exposure blades arranged in the latter and adapted to be operated by the ring and mechanism located in the casing in front of the blades for controlling the movement of the ring.

6. In a shutter, the combination with a casing having an apertured rear wall, an extension collar secured thereto, the proximate edges of the wall and collar being chamfered to provide a ball race, bearing balls therein and an annular member journaled on the balls, of exposure blades arranged within the casing and operated by said member and mechanism for controlling the opening and closing movement of the blades.

7. In a shutter, the combination with a casing, having a rear wall provided with an aperture and a rearwardly extending collar thereon surrounding said aperture and provided with a ball raceway, bearing balls arranged therein and a journal member defining the limits of the exposure aperture arranged within the collar and supported on said balls, of a ring mounted on the member, pivoted exposure blades connected to the casing and ring and operated by the rotary movement of one of said parts relatively to the other to open and close the aperture and mechanism for controlling the movement of the blades.

8. In a shutter, the combination with a casing having a rear wall provided with a central aperture and having a recess formed in its inner face surrounding the aperture and a ring journaled in the latter having a laterally extending flange located in said recess, of exposure blades pivotally connected to said flange and the wall of the casing and devices for oscillating said ring to adjust the blades into open and closed positions.

9. In a shutter, the combination with a casing having a rear wall provided with a central aperture and having a recess formed in its outer face surrounding the aperture, an extension collar fitting the rear wall having a flange centered in said recess, the proximate edges of the rear wall and collar within the aperture being chamfered to form a ball raceway, bearing balls located therein and a ring journaled on the balls and having a raceway, a portion of which is adjustable on the ring, of exposure blades operated by the ring and mechanism for controlling their opening and closing movement.

10. In a shutter, the combination with a casing having an apertured rear wall, an oscillatory member journaled on said wall and located in the aperture and studs arranged on the wall and member, of exposure blades journaled on the studs of the member and coöperating with those on the wall to cause them to open and close the aperture when one of the parts is oscillated relatively to the other, a plate arranged within the casing and fitted over the studs to hold the blades thereon and mechanism mounted on the plate for controlling their opening and closing movement.

11. In a shutter, the combination with a casing having an apertured rear wall and provided with a recess in its inner face surrounding the aperture, an oscillatory member journaled on the edge of the wall surrounding the aperture and a ring secured thereto and lying in the recess and provided with an operating projection, studs on the wall and ring and overlapping exposure blades coöperating with said studs, a plate arranged in the casing and fitting over said studs to retain the blades thereon and provided with an aperture accommodating the projection on the ring and mechanism mounted on the plate and coöperating with said projection to control the movement of the blades.

12. In a shutter, the combination with a casing having an apertured rear wall, pivoted exposure blades arranged in front of the wall, a member for operating them arranged in rear of the blades and journaled on the edges of the wall surrounding the aperture and provided with a forwardly extending operating projection and a plate overlying the blades having a central opening, and a surrounding recess in its outer face and provided with an aperture through which the projection on the operating member extends, of adjustable diaphragm blades and a member for operating them all located in the recess in the plate, devices mounted on the front of the plate and coöperating with the projection for controlling the movement of the blades and means extending exteriorly of the shutter casing for adjusting the diaphragm blades.

13. In a shutter, the combination with an apertured wall, a plurality of blades extending inwardly and having their points overlapping at the center of the aperture to close the latter, of pivotal supports for the blades arranged exteriorly of the aperture each of said blades having a lateral edge and a bottom edge adapted to coöperate with the bottom and lateral edges respectively of the adjacent blade during their opening movement and after their points have been separated to form a central opening having radiating extensions and means for oscillating the blades to open and close the aperture.

14. In a shutter, the combination with an apertured wall and movable exposure blades having points overlapping at the center of the aperture and closing it, each of said blades being provided with a lateral and a bottom edge meshing at its point and coöperating with the bottom and lateral edges respectively of the adjacent blade to form a central exposure opening having a radial extension which decreases in size until the points of the blades overlap in their closing movement, of a member for operating the blades and means for controlling its movement.

15. In a shutter, the combination with an apertured wall, and movable exposure blades having outer pivoted ends and points at their inner ends overlapping at the center of the aperture and closing it, each of said blades being provided with a lateral and a bottom edge which respectively coöperate with the bottom and lateral edges of the adjacent blade to form during their opening and closing movements a central exposure opening having radial extensions, said blades also having, at the outer ends of their lateral edges, portions for guiding the point of each adjacent blade, of means for oscillating the blades.

16. In a shutter, the combination with an apertured wall having projections thereon and a member movable relatively thereto provided with bosses in proximity to the projections, of exposure blades provided with perforations fitting the bosses and arranged with their inner ends overlapping and closing the aperture and having their outer ends slotted and fitting the projections, said blades being provided with laterally extending shoulders surrounding their perforations and at the sides of their slots.

17. In a shutter, the combination with pivoted exposure blades, a member for opening and closing them and a master member coöperating therewith, of a bulb exposure lever adapted to move into the path of the master member, an operating member for setting the master member which coöperates with said lever to normally move it into inoperative position and release it after the master member is set, and a pivoted time lever carried on the bulb lever and also controlled by the operating member in its movement into and out of the path of the master member.

18. In a shutter, the combination with pivoted exposure blades, a member for opening and closing them and a master member coöperating therewith, of bulbs and time exposure levers both having stops adapted to engage successively with the master member during its movement in one direction, an operating member coöperating with the master member and the bulb and time levers which in moving in one direction operates and releases the master member and allows the bulb lever to move into engagement therewith and in traveling in the opposite direction disengages the bulb lever and allows the time lever to engage the master member.

19. In a shutter, the combination with a casing, exposure blades therein, a member for operating them, and a master member for actuating it, of bulb and time stop levers coöperating with the master member and provided with opposing cam surfaces, an operating member for setting the master member having a portion lying between and coöperating with said cam surfaces to allow said levers to successively engage the master member.

20. In a shutter, the combination with a casing, exposure blades therein, a member for operating them, and a master member for actuating it, of bulb and time stop levers adapted to coöperate with the master member, a pivoted time controlling member coöperating with both levers for adjusting and holding them in inoperative position and an operating member coöperating with the master member.

21. In a shutter, the combination with a casing, exposure blades therein, a member for operating them, and a master member for actuating it, of bulb and time stop levers adapted to coöperate with the master member, having opposing cam surfaces, a pivoted time controlling member coöperating with the levers having a projection adapted to move the time lever into an inoperative position and subsequently move the bulb lever into inoperative position and hold both levers when so adjusted and an operating member coöperating with the master member.

22. In a shutter, the combination with a casing, exposure blades therein, a member for operating them and a master member coöperating therewith, of motor springs for driving the operating and master members, bulb and time stop levers adapted to coöperate with the master member, a time controlling member adjustable into engagement with the levers for moving them into inoperative position having a finger adapted to engage with and place the motor springs under tension, and a device for setting the master member.

23. In a shutter, the combination with a casing, exposure blades therein, a member for operating them and a master member coöperating therewith, of motor springs for driving the operating and master members, a pivoted bulb stop lever and a pivoted time lever mounted thereon, both adapted to coöperate with the master member and having opposing cam surfaces, a time controlling member having a projection at one side of its pivot adapted to enter between said levers and move them both into inoperative position, a similar projection on the member at the other side of its pivot adapted to place the motor springs under tension when the member is rotated in one direction.

24. In a shutter, the combination with a casing, exposure blades therein, a member for operating them and a master member coöperating therewith having a stop thereon, of a device for setting the master member, a time lever having a safety stop adapted to engage with the master member stop and provided with a shoulder and a tripping surface extending thereon, said lever normally moving in a direction to arrest the master member, a tripping projection on the setting device coöperating with the shoulder on the lever to limit the retrograde movement of the setting device and coöperating with the tripping surface to carry the safety stop out of operative position.

25. In a shutter, the combination with a casing, exposure blades therein and mechanism for actuating them, including a setting member for operating said mechanism, of an exposure indicator which is adjusted by the operating mechanism upon each opening movement of the exposure blades.

26. In a shutter, the combination with a casing, exposure blades therein and mechanism for operating them, of a setting member for actuating said mechanism, an exposure indicator arranged within the casing having indicating characters thereon and a pawl operated by the setting member and coöperating with the indicator.

27. In a shutter, the combination with a casing, exposure blades therein and mechanism for operating them, of a setting member for actuating said mechanism, a disk pivoted within the casing having indices thereon and having a portion projecting exteriorly of the casing and means for rotating the disk step-by-step upon each exposure of the blades.

PAUL J. MARKS.

Witnesses:
G. WILLARD RICH,
RUSSELL B. GRIFFITH.